United States Patent
Van Vliembergen et al.

(10) Patent No.: US 11,186,107 B2
(45) Date of Patent: Nov. 30, 2021

(54) METHOD OF PRINTING ON MEDIA OF A GIVEN MEDIA TYPE

(71) Applicant: Canon Production Printing Holding B.V., Venlo (NL)

(72) Inventors: Eduardus J. W. Van Vliembergen, Venlo (NL); Thijs A. P. Van Stiphout, Venlo (NL); Wilhelmus J. E. G. Verhofstad, Venlo (NL); Gerardus G. J. C. Kessels, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 17/074,073

(22) Filed: Oct. 19, 2020

(65) Prior Publication Data
US 2021/0129563 A1    May 6, 2021

(30) Foreign Application Priority Data
Oct. 31, 2019    (EP) .................... 19206666

(51) Int. Cl.
*B41J 29/393*    (2006.01)
*G06F 3/12*    (2006.01)

(52) U.S. Cl.
CPC .......... *B41J 29/393* (2013.01); *G06F 3/1256* (2013.01)

(58) Field of Classification Search
CPC ...... B41J 29/393; B41J 11/009; B41J 11/485; G03G 2215/00751; G03G 2215/00755; G03G 2215/00759; H04N 1/00761; H04N 1/00769; G06F 3/1219; G06F 3/1255; G06F 3/1256
See application file for complete search history.

(56) References Cited

U.S. PATENT DOCUMENTS

| | | | | |
|---|---|---|---|---|
| 7,436,532 | B2* | 10/2008 | Tsujimoto | G06K 15/005 358/1.15 |
| 7,835,043 | B2 | 11/2010 | Gila et al. | |
| 2005/0018219 | A1 | 1/2005 | Senn et al. | |
| 2015/0156376 | A1 | 6/2015 | Paul | |
| 2018/0017916 | A1* | 1/2018 | Sasaki | B65H 7/02 |

FOREIGN PATENT DOCUMENTS

| | | | |
|---|---|---|---|
| WO | WO-2015136397 A1 * | 9/2015 | B41J 15/048 |
| WO | WO 2020/148286 A1 | 7/2020 | |

OTHER PUBLICATIONS

Eurepean Search Report, issued in Priority Application No. 19206666, dated Apr. 23, 2020.

* cited by examiner

*Primary Examiner* — Julian D Huffman
(74) *Attorney, Agent, or Firm* — Birch, Stewart, Kolasch & Birch, LLP

(57) ABSTRACT

A printing method comprising the steps of: supplying media of a given media type to a printer; printing images onto the media in accordance with given print specifications and settings, thereby to obtain a print result; measuring a performance indicator that is representative of a property of the print result; and comparing the measured performance indicator to a corresponding target value, wherein the target value for said performance indicator is obtained from an actual or simulated production print process on media of the given media type; and in that a message is produced when the measured performance indicator deviates from the target value by more than a threshold value.

16 Claims, 3 Drawing Sheets

METHOD OF PRINTING ON MEDIA OF A GIVEN MEDIA TYPE

CROSS REFERENCE TO RELATED APPLICATIONS

This application claims priority under 35 U.S.C. § 119(a) to Application No. 19206666.0, filed in Europe on Oct. 31, 2019, the entire contents of which is hereby incorporated by reference into the present application.

BACKGROUND OF THE INVENTION

Field of the Invention

The invention relates to a printing method comprising the steps of:
  supplying media of a given media type to a printer;
  printing images onto the media in accordance with given print specifications and settings, thereby to obtain a print result;
  measuring a performance indicator that is representative of a property of the print result; and
  comparing the measured performance indicator to a corresponding target value.

A print medium is defined to be a material for receiving marking material deposited by the printer. The print medium may be paper, plastic, wood, textile, glass, etc. In order to make optimal prints on the print medium, print media profiles may be created. A print media profile is a set of print system parameters that define the settings on the print system for a specific print media/ink/printer/RIP combination. By providing customers with a profile for the media to be used, a trial-and-error process for the customer is eliminated and it is confidently known that the print media works with the print system. Depending on the customer other media profiles may be used, sometimes optimized on quality, sometimes on productivity or cost. When an end user runs into problems during printing on a print medium, a cause may be that wrong print system settings are used, media of a wrong media type are supplied to the printer, a deviating production batch of a correctly identified media type making other settings more appropriate, or even changes in environmental conditions necessitating other settings, so that there is a mismatch between the settings and the media type.

Background of the Invention

To run a certain print medium on a print system, the print system needs to use prescribed print system parameters to print on this print medium. For a cut sheet ink jet printer, some important values are a total area coverage (TAC), i.e. an amount of marking material that can be placed on the print medium, mono TAC (TAC for a single color), an amount of primer ink, a temperature of a print surface, a distance from the print head to the print medium, a print speed along the paper path, subpressure at a fixation belt, and a color profile to be applied. A TAC that is too high for the print medium may result in marking material deposition inside the print engine as pollution or smearing and when printed for a longer time will result in damage to the print engine. Print system parameters further influence the print quality and the amount of sheets that are rejected by the print system due to deformation of the sheets as well as deformation after deposition of a printed sheet.

European patent application 19 152 103.8, which constitutes prior art pursuant to Article 54(3) EPC, discloses a method for profiling a print medium for use in a printing system. This method involves printing a number of test print jobs and establishing a table of mutually compatible print parameter settings on the basis of test results obtained in the test jobs.

US 2005/018219 A1 discloses a printer that is configured for a method as specified in the opening paragraph and is equipped with a built-in color measurement device for measuring the color response of a number of color measurement fields that are printed on a margin of a media. The measured response is compared to pre-existing color profiles for the purpose of selecting a color profile that is best suited for the given media type.

It is an object of the invention to provide a printing method in which a match between the print settings and the media used for printing is monitored during production printing without having to use test jobs or test fields.

SUMMARY OF THE INVENTION

In order to achieve this object, the method according to the invention is wherein: the target value for said performance indicator is obtained from an actual or simulated production print process on media of the given media type; and in that a message is produced when the measured performance indicator deviates from the target value by more than a threshold value.

In this method, the comparison between the measured performance indicator and the target value does not aim at establishing a color profile or a media profile but aims at monitoring the performance indicator during the production print processing in order to detect a situation where a mismatch between the print settings and the media being used leads to a substantial deviation of the measured performance indicator from the target value. Such a situation may occur for example if the user or an operator of the printer has loaded media of the wrong media type or when the media, although they are of the type for which the media profile has been established, belong to a production batch which is different from the batch that has been used for establishing the media profile, so that the media that are actually being used have different properties. Yet other reasons may be that a mismatch between the settings and the media is caused by ageing effects or changes in environmental conditions (most notably temperature and humidity) that have an impact on the properties of the media and/or the marking material and/or components of the printer that are involved in the print process.

In any such case, the method according to the invention will assure that the mismatch is detected automatically and the user or operator is alerted of the problem and may be prompted to check whether the media type is correct and, if it is correct, the user may be recommended to recalibrate the media profile. Depending on the performance indicator, the printing may be stopped, for example to prevent (further) pollution of the print engine, or printing is continued until the operator stops the printing process. If the operator performs a recalibration, or takes other counter-measures, he may proceed with the stopped print job or alternatively rerun the stopped print job.

It is observed that, in the phrase "a performance indicator" in claim 1, the word "a" shall be construed as an indefinite article and does not imply that there is only a single performance indicator. Actually, the method may comprise obtaining target values for a plurality of performance indicators and measuring each of these performance indicators. Then, the message will be produced if at least one of the measured performance indicators deviates from its related target value by more than a threshold value that is specifically defined for that particular performance indicator or a norm function of deviations exceeds a threshold value. Furthermore, what performance indicators are checked may be dependent on the actual page content. For example, if a page only contains black and white text and line art, performance indicators for color quality control may be ignored, however, performance indicators for edge sharpness and color bleed are still relevant. Therefore, it is advantageous to include a step of determining what performance indicators to consider by examining the contents of the pages (as a whole) or for each page individually.

The threshold value may be a preconfigured value or may be made dependent on a further determined condition, for example an environmental condition such as a temperature.

More specific optional features of the invention are indicated in the dependent claims.

The performance indicator or one of the performance indicators may be representative of a property of the image that has been printed on the media. Examples of performance indicators of this type are quality parameters describing the color gamut, micro uniformity of the printed image, the presence of print artefacts and the like. Other performance indicators may describe qualities that relate to the print substrate, i.e. the media itself rather than the image printed thereon. Examples are deformation or cockling of the media, smearing, carboning or end-deformation of the media. Yet another class of performance indicators may relate to effects that result from the print processing, such as wear or contamination of components of the printer. The target values associated with such undesired effects will normally be zero, but there will always be a certain limit to which cockling, contamination and the like can be tolerated, and a recalibration of the settings will only be recommended when a tolerance threshold is exceeded.

One of the performance indicators that describe properties of the printed image may be the entire printed image itself. The related target value will then be a target image as specified by a PDF, for example, or a digitally stored "golden image" that has been obtained in a previous print processing with the same media.

Other examples of performance indicators that describe the printed image may be qualities such as color saturation, hue, density, contrast and the like in selected areas of the printed image.

In many cases, a media profile or any other kind of media description will be available for the media to be used on the printer. Then, the print processing and the expected result may be simulated on the basis of the known properties of the media and the print settings. In these cases, the target values for the performance indicators can be calculated on the basis of the media description and the settings and may then be compared to the measured results of the physical print processing.

In another embodiment, assuming that a match between the media and the settings has initially existed and the print job consists of printing multiple copies of the same image contents, the target value may be constituted by the first image being printed or by an average of the first few images that have been printed. Then, in the course of the print run, it will be checked whether or not the printed images drift away from the target image. Similarly, target values may be derived from measured qualities of the first few images (even if the image contents are varying), and in the later stages of the print run it will be checked whether the measured qualities deviate from these target values. These embodiments, in which the target value or values are derived from measurements on the printed images, have the advantage that less data processing power is required because the target values or target images need not be calculated.

BRIEF DESCRIPTION OF THE DRAWINGS

Embodiment examples of the invention will now be described in conjunction with the drawings, wherein.

DETAILED DESCRIPTION OF THE PREFERRED EMBODIMENTS

The embodiments are explained by considering a printing system comprising a print head or print assembly, like an ink jet printing system or an electro-photographical printing system. In principle, a printing system in which any kind of print medium, any kind of marking material, and, if needed, any kind of finishing material is to be loaded and the kind of marking material is to be printed on the kind of print medium may be configured to use the methods according to the embodiments of the present invention.

Figure 1:
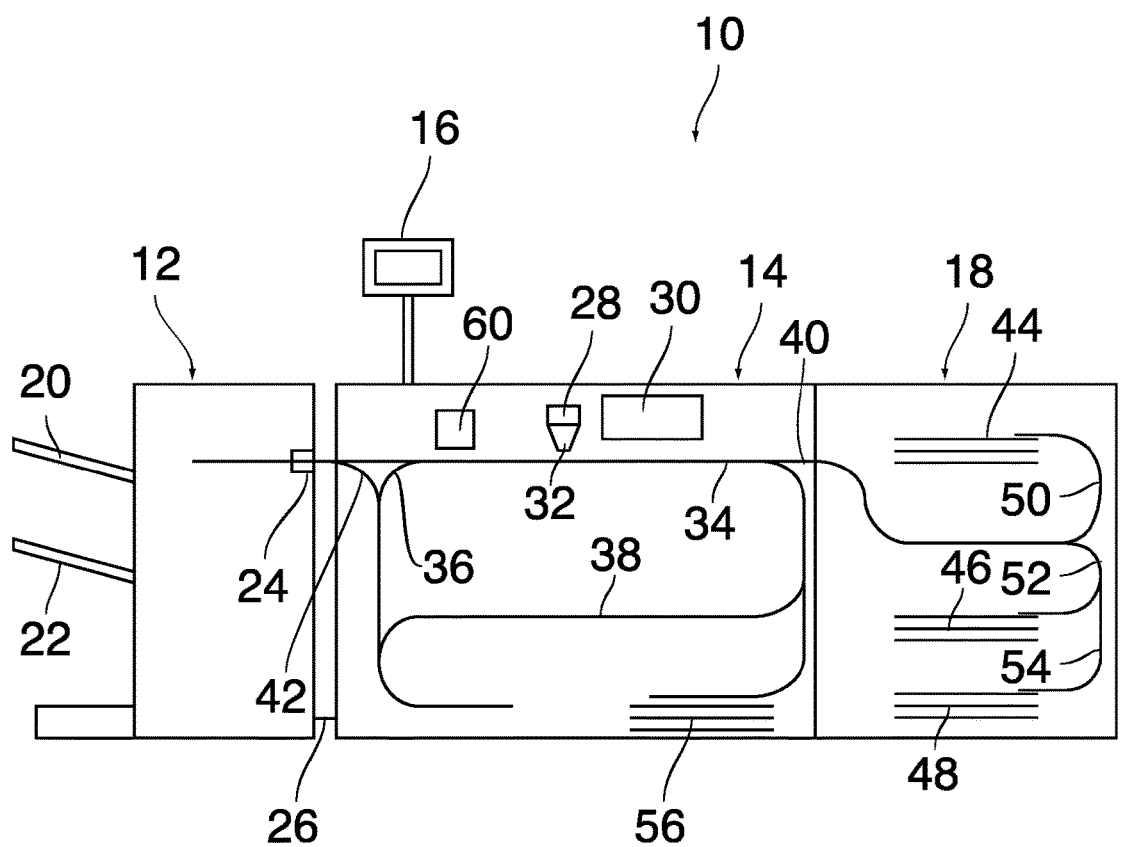
FIG. 1 is a general view of a printer to which the invention is applicable.

FIG. 1 shows schematically an exemplary printer 10 for which the method according to the invention is applicable. The printer 10 comprises an output section 12, a print engine and control section 14, a local user interface 16, and an input section 18.

The output section 12, the print engine and control section 14 and the input section 18 may comprise sensors to sense the conditions of the sheets when transported along a paper path from the input section 18 to the output section 12, which paper path will be elucidated hereinafter. The sensors are calibrated beforehand in order to assure that all measurement sensors involved in the method according to the present invention are calibrated and correctly operating, and to take sensor aging, pollution, environmental conditions like humidity and temperature into account when reading the sensor measurements.

The output section 12 comprises two output holders 20, 22 for holding printed print medium. The printed print medium is transported from the print engine and control section 14 via an inlet 24 to the output section 12. The output section 12 is digitally connected by means of a cable 26 to the print engine and control section 14 for bi-directional data signal transfer. Other supply material output holders may be envisioned, for example a supply material output holder for residuals of ink or toner or a supply material output holder for waste paper in case of drilling actions, cutting actions or perforating actions. Depletions of such a supply material output holder may be scheduled according to the method of the invention.

The print engine and control section 14 comprises a print engine 28 and a print controller 30 for controlling the printing process. The print controller 30 is a computer or server or a workstation, connected to the print engine and connected to the digital environment of the printing system, for example a network for transmitting a submitted print job to the printing system. The print controller 30 also comprises in local or remote storage a system specific or shared media catalogue software system (not shown) for print media which are profiled for use by the printer 10 or a printer of the type of printer 10 according to the method of the present invention. The print controller 30 also comprises a receiving section (not shown) for receiving print jobs submitted to the printer 10.

The printer 10 comprises a print head or print assembly 32 for ejecting or fixing marking material to the print medium, and a paper path with path sections 34, 36, 38 for transporting the print medium from an entry point 40 of the print engine and control section 14 to the inlet 24 of the output section 12. The print head or print assembly 32 is positioned near the paper path section 34. While a print medium is transported along the paper path section 34, the print medium receives the marking material from the print head or print assembly 32. A next paper path section 36 is a flip unit for selecting a different subsequent paper path for simplex or duplex printing of the print medium. The flip unit may be also used to flip a printed sheet of print medium after printing in simplex mode before the printed sheet leaves the print engine and control section 14 via a curved section 42 of the flip unit and via the inlet 24 to the output section 12. In another embodiment of the printing system the curved section 42 of the flip unit is not present and the turning of a simplex page has to be done via another paper path section 38 and leads to productivity loss. In another embodiment of the printing system an additional turning station—partly to replace the curved section 42 of the flip unit—is configured outside the print engine and control section 14 between the print engine and control section 14 and the output section 12.

When the print medium has to be printed in a simplex mode, the print medium may directly be transported via the flip unit 36 to the inlet 24 of the output section 12. When the print medium has to be printed in a duplex mode, the print medium is transported via the flip unit 36 to the other paper path section 38 for turning the print medium in order to switch front side and back side of the sheets. The sheets are then transported to the paper path section 34 again for printing on the rear side of the sheets by means of the print head or print assembly 32.

The input section 18 comprises a plurality of print medium input holders 44, 46, 48 for holding the print medium before transporting the sheets of the print medium to the print engine and control section 14. Sheets of the print medium are guided from the print medium input holders 44, 46, 48 by guiding means 50, 52, 54 to the entry point 40 for entrance into the print engine and control section 14. Sheets of the print medium are now guided from the print medium input holders 44, 46, 48 to the right side of the print medium input holders, but other configurations of the print medium holders may be envisioned for at least partly guiding the sheets to the left side. For these other configurations a suitable instruction for face up or face down loading of the print medium in the respective print medium input holder will be generated by the printer controller.

FIG. 1 shows a plurality of print medium input holders. The invention, however, also applies to a printing system comprising only one print medium input holder.

FIG. 1 shows a plurality of print medium output holders. The invention, however, also applies to a printing system comprising only one print medium output holder.

The print engine and control section 14 also comprises an additional input holder 56 for holding print medium. Print medium may have to be input in the additional input holder 56 in another orientation than an input orientation for the print medium holders 44, 46, 48.

A sensor 60 in the form of a scanner is provided in the print engine and control section 14 downstream of the print engine 28 and upstream of the flip unit 36 and is arranged for capturing digital images of the images that have been printed onto the media by the print engine 28. The digital images captured by the sensor 60 are used as performance indicators which can be examined electronically in order to judge certain aspects of the performance of the printing system.

Other sensors (not shown) may be arranged along the paper path sections 34, 36, 38 for capturing other performance indicators that may represent for example certain conditions of the print media and/or the print head or print assembly 32. For example, these sensors may detect cockles or defects in the print media, a contamination of the print head or print assembly 32, and the like.

A first example of the method according to the invention will now be explained by reference to the flow diagram shown in FIG. 2.

In step S1, the print controller 30 reads job specifications for a print job to be processed. The job specifications include information on the type of print media to be used.

In step S2, an operator is prompted, e.g. via the user interface 16, to load media of the type specified in the job specifications into one of the holders 44, 46, 48 in the input section 18.

In step S3, the print controller 30 reads a media description that describes the relevant properties of the media. For example, the media description may be in the form of a media profile.

In step S4, the print controller 30 adjusts the settings of the printer in accordance with the print job specification.

In step S5, the image data for a first image to be printed are read and ripped in the print controller 30.

In step S6, a simulation module that is formed by software and/or hardware in the print controller 30 and is specifically designed for the method according to the invention calculates target values for one or more performance indicators on the basis of the media description read in step S3, the settings adjusted in step S4 and the image data read in step S5. The performance indicators for which the target values are calculated are the performance indicators that can be measured by the sensor 60 and possibly the further sensors disposed along the paper path.

For example, the simulation module may search the image data for certain areas in the image to be printed that have a certain minimum size and are to be printed in a uniform color. Preferably, these areas are selected such that they represent a collection of the colors that are most dominant in the image. Then, on the basis of the properties of the media, the properties of the marking material to be used for printing the selected areas, possibly other settings of the printer, and on the basis of known properties of the sensor 60, the simulation module calculates for each of the selected areas a color value that the sensor 60 is expected to measure. Each of these color values will then be stored as a target value. If further sensors are provided in addition to the sensor 60, additional target values will be calculated for the performance indicators to be measured with these sensors.

In step S7, the print engine 28 prints the first image of the print job onto a first media sheet.

In step S8, the sensor 60 is used for measuring a performance indicator. This means that the scanner constituting this sensor scans the printed image, and image processing software in the scanner or in the print controller 30 identifies one of the areas in the image for which a color value has been calculated in step S6, and the color value that the scanner has captured for this area is read.

In step S9, the color value read in step S8 are compared to the target value that has been calculated for this performance indicator in step S6.

In step S10, it is checked whether the performance indicator deviates from its associated target value by more than a threshold value which is specific to that particular performance indicator.

If a deviation of more than the threshold value is detected, an output message is output via the user interface 16 in step S11.

The message may for example comprise a user message such as a text message or a dialog inviting the user or operator to check whether the correct media have been loaded into the holder 44, 46 or 48 from which the media have been fed. Then, if the user confirms that the media type is correct, the user interface may display a recommendation to recalibrate the media description and the related settings for this media type. For example, the calibration process described in European patent application 19 152 103.8 may be used for that purpose. Furthermore, such a recalibration may also be automatically initiated. Optionally, the message may also be output in the form of a status icon.

If it is found in step S10 that there is no substantial deviation between the performance indicator and its target value (N), it is checked in step S12 whether there are more performance indicators to consider. If that is the case (Y), the process loops back to step S8, and the next performance indicator is measured and the loop of the steps S9, S10 and S12 is repeated until a message is output or all performance indicators have been checked.

If more sensors are provided, the performance indicators measured by these sensors are also compared to their corresponding target values calculated in in extra cycles of the loop of steps S8 to S12.

If the result "N" is obtained in step S12, i.e. if all performance indicator have been checked, it is checked in step S13 whether the print job has been completed, i.e. whether all images have been printed. If that is not the case (N), then the process loops back to step S5, where the image data for the next image are read, and the loop comprising the steps S6 to S13 is repeated until either an message is output in step S11 or a positive result (Y) is obtained in step S13 and the process ends with step S14. Optionally, the measured deviations of the performance indicators may be reported upon completion of the job as part of a quality control procedure.

Figure 3:
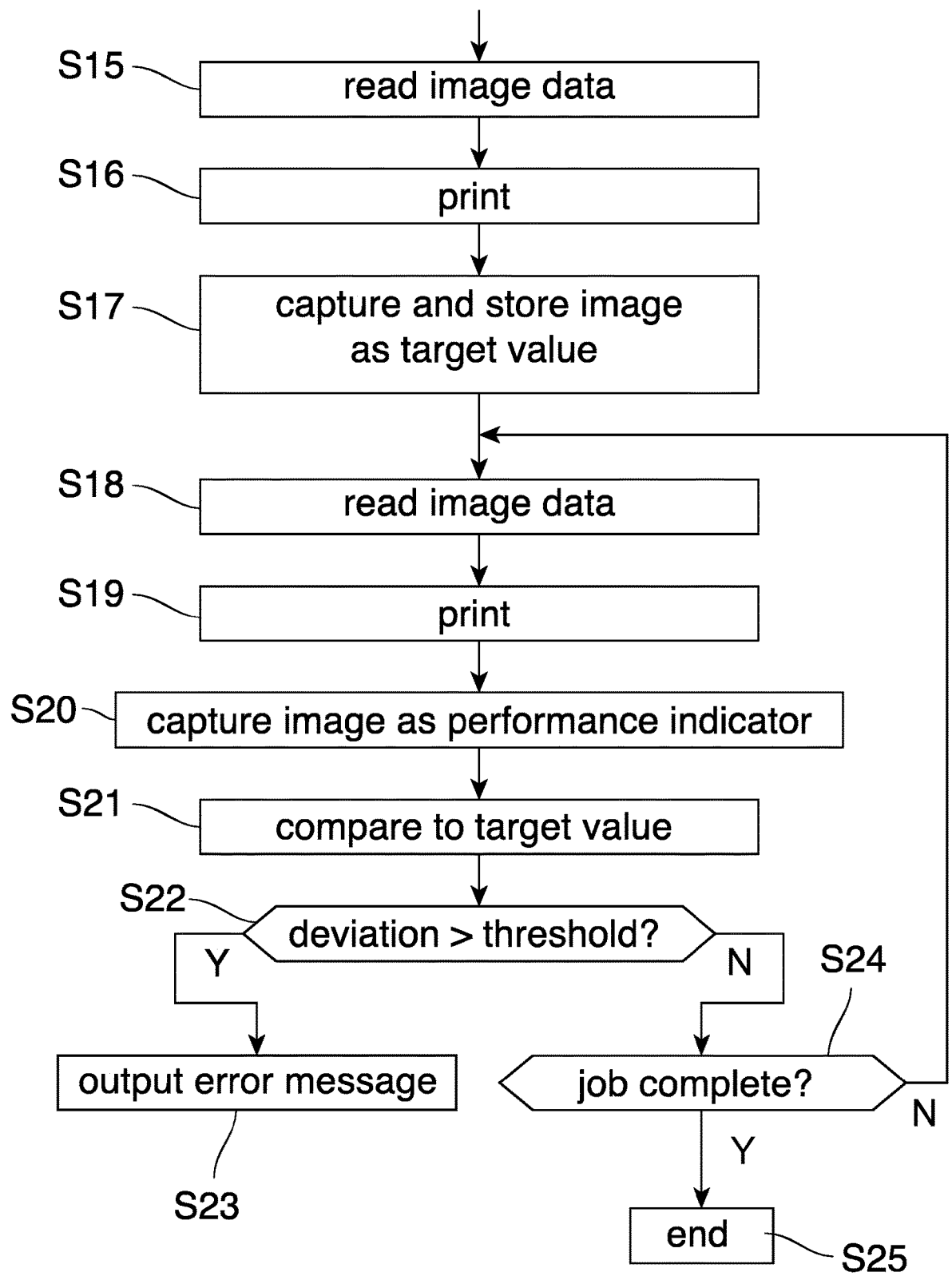

A modified example of a method according to the invention has been illustrated in FIG. 3. In this example, it is assumed that the print job consists of printing a large number of copies of one and the same image. Further, it is assumed that the correct media have been loaded in the input section 18. In this case, the purpose of the method is to check whether there is any drift in the properties of the media and/or the properties of the printer and/or the marking material in the course of the print process, and this drift leads to a deviation between the print products obtained and the intended results.

Figure 2:
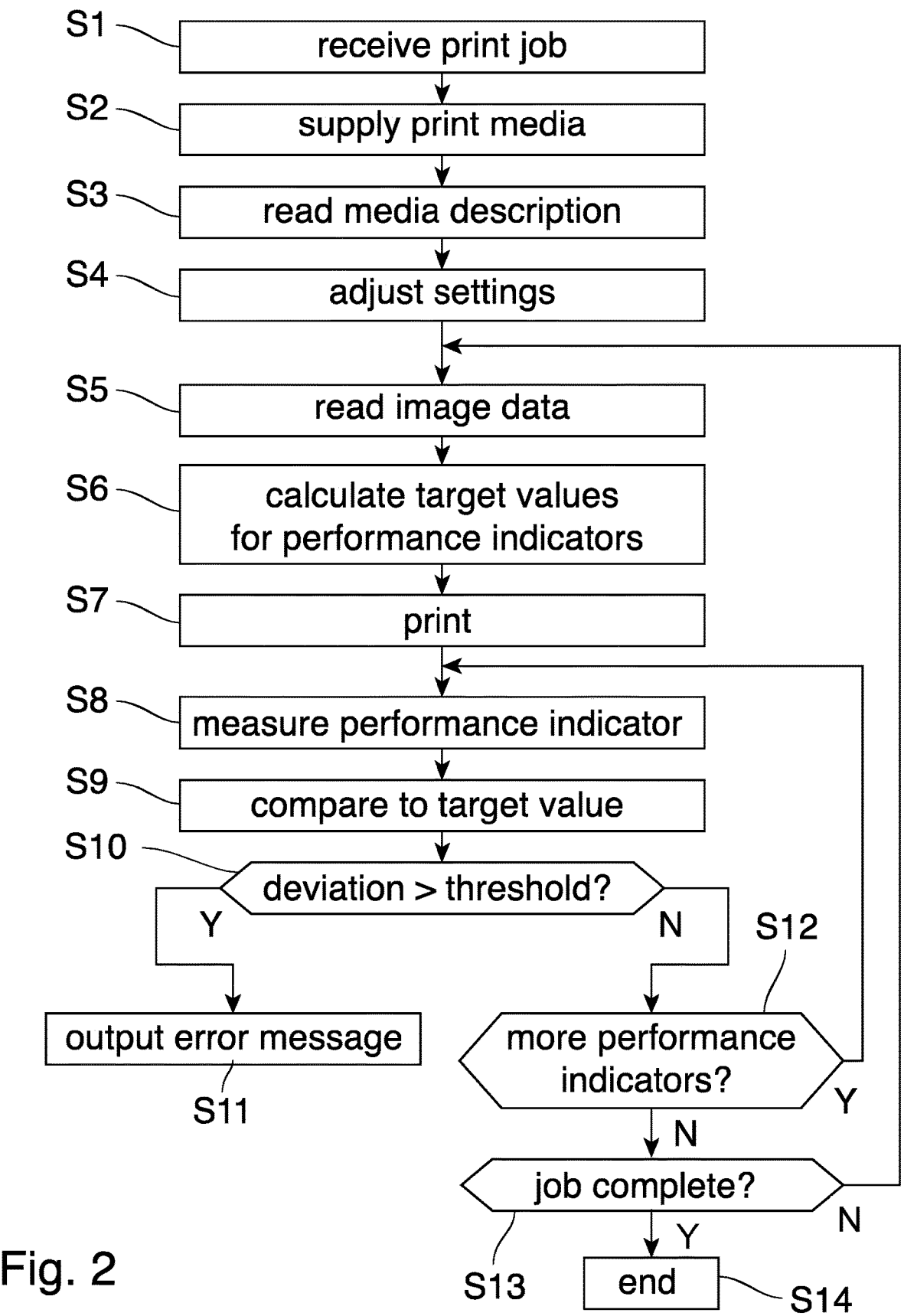
FIGS. 2 and 3 are flow diagrams illustrating embodiments of the invention.

The first steps of the method are the same as steps S1 to S4 in FIG. 2 and have therefore not been shown in the flow diagram in FIG. 3.

Step S15 in FIG. 3 is a step of reading the image data for a first image, and step S16 is a step of printing the first image.

In step S17, the sensor 60 captures the image that has just been printed and stores it in digital form as the only "target value" that is considered in this embodiment. In other words, the target value is the entire appearance of the printed image as captured with the sensor 60 and encoded for example in the set of RGB pixel values for all pixels of the image.

Then, the image data for a subsequent image are read in step S18, and this image is printed in step S19.

In step S20, the image that has been printed in step S19 is captured with the sensor 60. This captured image is considered as the only performance indicator in this embodiment.

In step S21, the performance indicator is compared to the target value, which means in this case that the image captured in step S20 is compared to the stored image that was captured in step S17. The comparison consists in applying any suitable metric that quantifies a difference between two images, e.g. the means square of the difference in RGB color values averaged over all pixels, or the like.

In step S22, it is checked whether the comparison result, i.e. the deviation, is above a threshold value, and if that is the case, a message is output in step S23.

If the deviation checked in step S22 is not smaller than the threshold (N), it is checked in step S24 whether the job has been completed, and the steps S18 to S24 are looped through until the loop is exited by outputting a message in step S23 or a positive result (Y) is obtained in step S24 and the process ends with step S25.

Furthermore, the deviation may be reported as part of a proof run.

The method that has been described by reference to FIG. 3 may be modified in various ways. For example, the steps S15 to S17 may be repeated several times in order to capture a plurality of images and then to form the target value by averaging over the captured images.

Moreover, instead of directly comparing two images to one another, it is also possible to store (in step S17) several target values that represent colors of selected areas in the image or images as captured with the sensor 60. Then, the comparison step S21 will comprise searching the image that has been captured in step S20 for image areas for which the image data, as specified in the print job, prescribe the same colors as were prescribed by the image data for the image areas from which the target values have been derived in step S17. In that case, it is not prerequisite that the image contents of the image or images captured in step S17 are the same as the image contents of the images captured in step S20. It is only required that, as judged by the job specification, the images contain a set of identical colors.

In yet another embodiment, the methods described by reference to FIGS. 2 and 3 may be combined with one another. Then, when the first few images of a job are printed in accordance with steps S15 to S17 in FIG. 3, a procedure analogous to steps S5 to S10 in FIG. 2 may be employed for confirming that the correct media have been loaded. Then, when the rest of the images of the print job are printed, the data processing load may be reduced by switching to the method according to FIG. 3, i.e. to use the first few images and the target value or values derived therefrom as the target values in steps S18 to S22.

What is claimed is:

1. A printing method comprising the steps of:
supplying media of a given media type to a printer;
printing images onto the media in accordance with given print specifications and settings, thereby to obtain a print result;
measuring a performance indicator that is representative of a property of the print result; and
comparing the measured performance indicator to a corresponding target value,
wherein the target value for said performance indicator is obtained from an actual or simulated production print process on media of the given media type, and wherein a message is produced when the measured performance indicator deviates from the target value by more than a threshold value.

2. The method according to claim 1, wherein the step of obtaining the target value comprises calculating the target value on the basis of a media description of the media to be used and/or settings of the printer and/or image data specifying images to be printed.

3. The method according to claim 2, wherein the performance indicator and the target value are each constituted by a set of digital data that describe an entire image, and the step of comparing the performance indicator to the target value comprises calculating a metric that quantifies a difference between the performance indicator and the target value.

4. The method according to claim 1, comprising a step of obtaining the target value by printing at least one reference image in a first phase of a print job, capturing said at least one reference image, and deriving the target value from the captured image.

5. The method according to claim 4, wherein the performance indicator and the target value are each constituted by a set of digital data that describe an entire image, and the step of comparing the performance indicator to the target value comprises calculating a metric that quantifies a difference between the performance indicator and the target value.

6. The method according to claim 4, comprising:
obtaining a plurality of target values for a corresponding plurality of performance indicators,
comparing each performance indicator to its target value, and
producing the message if at least one measured performance indicator deviates from the associated target value by more than a threshold value that is specific to that pair of performance indicator and target value.

7. The method according to claim 6, wherein the target values comprise color values for areas of an image to be printed, and the related performance indicators comprise color values of selected areas of a printed image, the areas being selected on the basis of print instructions which prescribe for each of these areas a color value that is identical with a color value prescribed for an image area that was used for obtaining the related target value.

8. The method according to claim 1, wherein the performance indicator and the target value are each constituted by a set of digital data that describe an entire image, and the step of comparing the performance indicator to the target value comprises calculating a metric that quantifies a difference between the performance indicator and the target value.

9. The method according to claim 1, comprising:
obtaining a plurality of target values for a corresponding plurality of performance indicators,
comparing each performance indicator to its target value, and
producing the message if at least one measured performance indicator deviates from the associated target value by more than a threshold value that is specific to that pair of performance indicator and target value.

10. The method according to claim 1, wherein the step of printing is performed on a cut-sheet printer.

11. A printer comprising:
a print engine configured for printing images on print media;
a print controller configured for controlling the print engine, wherein the print controller is configured to print images onto print media in accordance with given print specifications and settings, thereby to obtain a print result; and
at least one sensor configured for measuring a performance indicator that is representative of a property of the print result obtained with the printer,
wherein the controller is configured to compare the measured performance indicator to a corresponding target value, the target value for said performance indicator being obtained from an actual or simulated production print process on media of a given media type, and
wherein the controller is configured to produce a message when the measured performance indicator deviates from the target value by more than a threshold value.

12. The printer according to claim 11, wherein obtaining the target value comprises calculating the target value on the basis of a media description of the media to be used and/or settings of the printer and/or image data specifying images to be printed.

13. The printer according to claim 11, wherein the target value is obtained by printing at least one reference image in a first phase of a print job, capturing said at least one reference image, and deriving the target value from the captured image.

14. A non-transitory computer readable recording medium comprising computer executable program code configured to instruct a computer to perform a printing method comprising:
printing images with a printer onto media in accordance with given print specifications and settings, thereby to obtain a print result;
measuring a performance indicator that is representative of a property of the print result;
comparing the measured performance indicator to a corresponding target value, the target value for said performance indicator being obtained from an actual or simulated production print process on media of the given media type; and
producing a message when the measured performance indicator deviates from the target value by more than a threshold value.

15. The non-transitory computer readable recording medium according to claim 14, wherein obtaining the target value comprises calculating the target value on the basis of a media description of the media to be used and/or settings of the printer and/or image data specifying images to be printed.

16. The non-transitory computer readable recording medium according to claim 14, wherein the target value is obtained by printing at least one reference image in a first phase of a print job, capturing said at least one reference image, and deriving the target value from the captured image.

* * * * *